UNITED STATES PATENT OFFICE.

BELA A. KELLER, OF NEWARK, NEW JERSEY, ASSIGNOR OF ONE-THIRD TO MARION E. MESSERSMITH, OF NEWARK, NEW JERSEY, AND ONE-THIRD TO MOSES E. STERN, OF NEW YORK, N. Y.

TREATMENT OF METALS AND THEIR SURFACES.

1,393,290.      Specification of Letters Patent.      Patented Oct. 11, 1921.

No Drawing.     Application filed May 28, 1919. Serial No. 309,273.

*To all whom it may concern:*

Be it known that I, BELA A. KELLER, a citizen of the United States, residing at Newark, in the county of Essex and State of New Jersey, have invented certain new and useful Improvements in Treatment of Metals and their Surfaces; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in the art of applying to a base of metal a non-metallic covering, consisting essentially of a combination of celluloid, or analogous material and acetone, the mixture being suitably colored, and applied to the surface of the metal base, said surface having been previously treated with a composition of shellac, denatured alcohol and ether.

With the above in view, the invention has for its principal object, as new article of manufacture, as well as a new method or process of producing the same, a metal base incased or having a covering of a non-metallic material, such as celluloid or analogous material, such metal base treated and covered in the manner hereinafter more fully stated, being capable of and adapted to many uses, and especially for optical goods, fronts, bridges and temples for eye-glasses and spectacles.

The invention has for its further object to provide a base of metal with a coating of a non-metallic material, such as celluloid or other analogous material, which is neat in appearance, is sanitary, and will produce a covered surface which will not crack when subjected to bending or other hard usage.

Other objects of the present invention not at this time more particularly mentioned will be clearly understood from the following detailed description of the present invention.

With the various objects of the present invention in view, the said invention consists in the provision of a base of metal with a coating of a non-metallic material, as celluloid, or other analogous material, as a new article of manufacture; and the present invention consists, furthermore, in the novel method or process of producing the same.

In carrying out the present invention to produce the new article of manufacture hereinabove stated, and to provide the novel method or process of treating the base of metal, the surface or surfaces of the base of metal, which may be of any size and shape, is first treated by immersion or dipping to a solution of shellac and composition of denatured alcohol and ether, the shellac being first dissolved in the denatured alcohol after which a proper quantity of ether is added.

The nature of this mixture or composition of matter is such that it can be readily applied to a metal surface, and permanently and positively adheres thereto, so as to provide a surface to which may be applied the non-metallic covering of celluloid or other analogous material.

In order that the non-metallic covering may be applied to the above stated prepared metallic surface, celluloid, or other analogous material is dissolved in acetone, or other similar solvent, to provide a liquid or semi-liquid, to which is added coloring matter in any suitable quantity, according to the color desired.

The previously mentioned shellac-mixture, after having been applied to the surface of the metal, is allowed to dry thereon, and the liquid or semi-liquid celluloid, or the like, acetone and coloring matter is then applied to the shellacked surface of the metal base by immersing or dipping the latter in said liquid or semi-liquid.

The various solutions are best prepared in or about the following proportions, viz:—

| | |
|---|---|
| Shellac | 1 ounce |
| Denatured alcohol | 2 ounces |
| Ether | 22 grains |
| Celluloid, or analogous material | 1 ounce |
| Acetone | 4 ounces |
| Coloring matter | Optional |

Good results are obtained by the mixtures above stated, and by the method of producing the same; it will be understood, however, that the ingredients by proportion or weight, may be varied, if desired, without departing from the principles of the present invention.

Having in the foregoing described my novel article of manufacture, as well as the novel composition of matter for covering a base of metal, and the method or process of treating the same, what I claim is:—

1. A method of treating the surface of a base of metal, which consists in treating the surface of said base of metal, first to a solution of shellac, denatured alcohol and ether, and secondly, to a solution of celluloid or analogous material, and acetone.

2. A method of treating the surface of a base of metal, which consists in treating the surface of said base of metal, first to a solution of shellac, denatured alcohol and ether, and secondly, to a solution of celluloid or analogous material, acetone, and coloring matter.

3. A method of treating the surface of a base of metal, which consists in treating the surface of said base of metal, first to a solution of shellac, denatured alcohol and ether, in the following proportions, shellac, 1 ounce, denatured alcohol, two ounces, ether 22 grains, and secondly to a solution of celluloid, or other analogous material, 1 ounce, and acetone 4 ounces.

4. A method of treating the surface of a base of metal, which consists in treating the surface of said base of metal, first to a solution of shellac, denatured alcohol and ether, in the following proportions, shellac, 1 ounce, denatured alcohol, two ounces, ether 22 grains, and secondly to a solution of celluloid, or other analogous material, 1 ounce, acetone, 4 ounces, and a coloring matter.

5. A method of treating the surface of a base of metal, which consists in immersing the same in a mixture of shellac, denatured alcohol, and ether, then drying the same, (and finally,) again immersing the same in a mixture of celluloid or other analogous material and acetone.

6. A method of treating the surface of a base of metal, which consists in immersing the same in a mixture of shellac, denatured alcohol, and ether, then drying the same, (and finally,) again immersing the same in a mixture of celluloid or other analogous material and acetone, and coloring matter, substantially as set forth.

In testimony that I claim the invention set forth above I have hereunto set my hand this 27th day of May, 1919.

BELA A. KELLER.

Witnesses:
 FRED F. C. FRANTZEL,
 BARBARA SUTTERLIN.